US006991448B2

(12) United States Patent
Lubberts

(10) Patent No.: US 6,991,448 B2
(45) Date of Patent: Jan. 31, 2006

(54) APPARATUS FOR EXTRUDING HONEYCOMB BODIES

(75) Inventor: Robert B. Lubberts, Woodhull, NY (US)

(73) Assignee: Corning Incorporated, Corning, NY (US)

( * ) Notice: Subject to any disclaimer, the term of this patent is extended or adjusted under 35 U.S.C. 154(b) by 251 days.

(21) Appl. No.: 10/405,669

(22) Filed: Apr. 1, 2003

(65) Prior Publication Data

US 2004/0197434 A1 Oct. 7, 2004

(51) Int. Cl.
*B29C 47/12* (2006.01)
(52) U.S. Cl. .................. 425/381; 425/466; 425/467; 264/177.12
(58) Field of Classification Search ............... 425/380, 425/381, 467, 466; 264/177.12
See application file for complete search history.

(56) References Cited

U.S. PATENT DOCUMENTS

| 4,333,896 | A | | 6/1982 | Cunningham ............... 264/40.5 |
| 4,668,176 | A | * | 5/1987 | Zeibig et al. ................ 425/464 |
| 4,710,123 | A | * | 12/1987 | Ziebig et al. ................ 425/464 |
| 4,915,612 | A | | 4/1990 | Gangeme et al. ........... 425/464 |
| 5,089,203 | A | | 2/1992 | Kragle .................. 264/177.11 |
| 5,980,227 | A | * | 11/1999 | Murata et al. .............. 425/144 |
| 6,455,124 | B1 | * | 9/2002 | Beall et al. ................. 428/116 |
| 6,663,378 | B2 | * | 12/2003 | Grover et al. .......... 425/192 R |
| 2003/0001308 | A1 | | 1/2003 | Shibagaki et al. ..... 264/177.11 |
| 2004/0164464 | A1 | | 8/2004 | Lubberts et al. ............ 264/630 |

* cited by examiner

*Primary Examiner*—Joseph S. Del Sole
(74) *Attorney, Agent, or Firm*—Randall S. Wayland; Anca C. Gheorghiu

(57) ABSTRACT

An extrusion apparatus which satisfactorily adjusts differences in skin-body flow rates at multiple locations around the die, and allows for the external manipulation of the interior components controlling batch flow, during the production without having to stop manufacturing operations to effect the necessary changes thereat.

8 Claims, 3 Drawing Sheets

APPARATUS FOR EXTRUDING HONEYCOMB BODIES

BACKGROUND OF THE INVENTION

The present invention relates to the extrusion of honeycomb bodies from plastic batches, and more particularly to an honeycomb extrusion apparatus having an improved control system for batch flowing into an skin-forming region of the die.

In an extruder, the batch flow path in the peripheral areas of the die, where the skin of the honeycomb structure is formed, is more complicated and more difficult to control than in the main field of extrusion, where the body of the honeycomb structure is formed. Batch flow control in the peripheral area of the die is important because skin defects (i.e., air checks, cell distortion/deformation, blisters, and the like) can later result in product failure.

U.S. Pat. No. 4,710,123 (Ziebig et al.) discloses an apparatus with adjustable means on the outlet side of the die for regulating the flow of the batch in the skin region, and bringing it in conformity with the flow rate of the batch in the main body region. The apparatus can also include a device (i.e., breaker plate) positioned at the inlet side of the die for further batch flow control.

U.S. Pat. App. Pub. 2003/0001308 (Shibagaki et al.) discloses an apparatus for controlling the batch in the skin region, the apparatus having an adjusting instrument with a flexible part which can be lowered into the skin region to regulate the flow rate.

Although these references address the problem of correlating flow between the skin and body regions, they provide no solution to the observed problem that flow rate differences in the material batch between the skin and body regions vary with die location. A disadvantage of the previous apparatuses is the allowance of only uniform correction of skin-body flow rate difference around the die. Under such circumstances skin-body flow rate differences may be insufficiently corrected at some locations around the die.

Therefore there exists a need for an extrusion apparatus which can satisfactorily adjust differences in skin-body flow rates at multiple locations around the die. Furthermore, there also exists a need for an extrusion apparatus which allows for the external manipulation of the interior components controlling batch flow, during the production without having to stop manufacturing operations to effect the necessary changes thereat.

SUMMARY OF THE INVENTION

In its simplest form, the present invention provides an extrusion apparatus which successfully balances the batch flow at the skin-body regions at multiple locations around the die, to form a honeycomb structure that is free of defects and meets customer standards.

The apparatus includes a die having an inlet face comprising peripheral feed holes and central feed holes, and an outlet face comprising interconnected discharge slots forming peripheral and central pins. A cavity is formed in a plurality of peripheral pins at the outlet face and is used for forming an outer skin on the honeycomb body.

A skin-forming assembly is positioned in the extrusion apparatus downstream from the die and adjacent the cavity at the outlet face, and includes a segmented flow controller and a mask, both supported on a holder. The flow controller and the mask are independent in movement. The segments of the flow controller are movable in an axial direction to batch flow.

A peripheral feed flow device is positioned upstream from the die, and adjacent the inlet face of the die. The peripheral feed flow device comprises a plurality, preferably six to twelve, of segments movable in a radial direction to batch flow. The extrusion apparatus also optionally includes, an extrudate bow corrector adjacent the peripheral feed flow device.

Adjustment means external to the extrusion apparatus are provided for controlling the operation of the skin-forming assembly, the peripheral feed flow device, and the extrudate bow corrector (if included), without interruption to the operation of the extrusion apparatus.

BRIEF DESCRIPTION OF THE DRAWINGS

The invention may be further understood by reference to the following drawings, wherein.

DETAILED DESCRIPTION OF THE PREFERRED EMBODIMENTS

Figure 1:
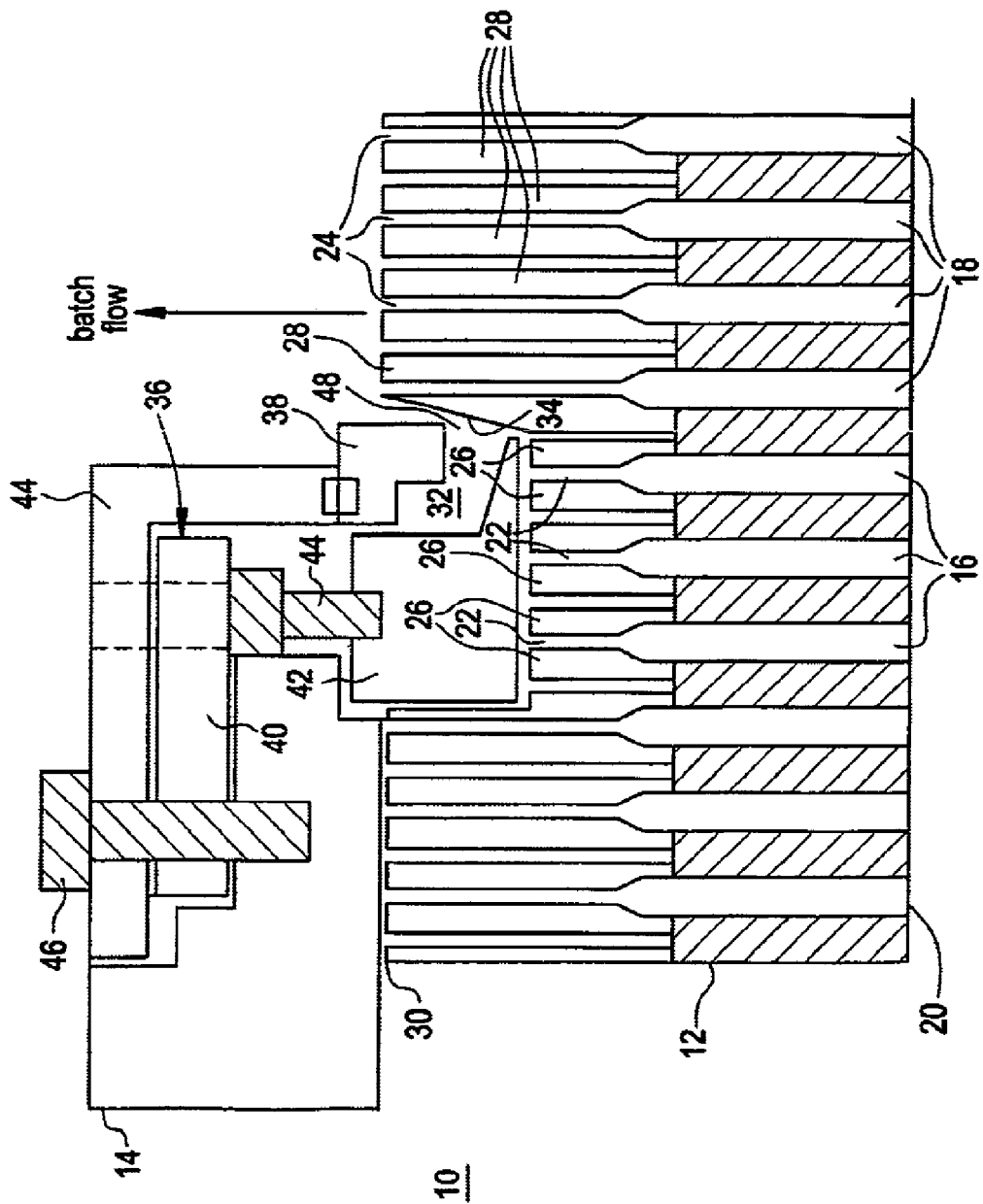
FIG. 1 is a sectional view of one aspect of the present invention showing a die and an adjustable skin-forming assembly.

Referring now to FIG. 1 therein presented is one aspect of the present invention, wherein a honeycomb extrusion apparatus 10 includes a die 12, and a skin-forming assembly 14. The die 12 is composed of peripheral feed holes 16 and central feed holes 18 communicating at one end with an inlet face 20, and at the other end with a plurality of interconnected peripheral discharge slots 22 and central discharge slots 24, forming peripheral pins 26 and central pins 28 at an outlet face 30. A section of the peripheral pins 26 are machined or cut-down to form a cavity 32 having a tapered surface 34. Cavity 32 at outlet face 30, is the skin-forming region of die 12. Beginning with central discharge slots 24 is the body-forming region of die 12.

The skin-forming assembly 14 is positioned downstream or adjacent outlet face 30 of the die 12, and includes a flow controller 36 and a mask 38. The flow controller 36 is comprised of a plurality of segments 42, preferably six to twelve, movably mounted to holding plate 40. The key role of the flow controller 36 is to meter batch flow out of peripheral discharge slots 22 into cavity 32. Segments 42 can be adjusted to completely cover discharge slots 22, and interrupt flow of the batch material into cavity 32. Accordingly, an advantage of the segmented flow controller 36 is versatility in the amount and location of batch flow in the skin region.

Mask 38 is attached peripherally to support 44, and is movable relative to the batch flow. The key role of mask 38 is to form a gap 48 with tapered surface 34 of cavity 32 for determining the skin thickness. The mask 38 is therefore used to control the width of gap 48. Again though, control of batch flow in cavity 32 is performed with flow controller 36. Batch flow varies to different degrees depending on location around the die. The number of segments 42 provided on flow controller 36 is dependent on the size of the die, and the shape/size of the honeycomb product being formed.

A feature of the skin-forming assembly 14 is external control adjustment. Specifically, by "external control" is meant that skin-forming assembly 14 can be adjusted from outside the extrusion apparatus to desired settings during the manufacturing operations without interruption of production. Adjustment means are shown at 46a–b in the form of bolts. Specifically, bolt 46a regulates the movement of segments 42 on flow controller 36, and bolt 46b regulates the movement of the mask 38. Thus adjustment means 46a–b are rotated to cause movement and obtain the desired setting of the flow controller 36 and mask 38. This rotation is accomplished with a suitable wrench, or possibly by pneumatic or hydraulic means (not shown). Flow controller 36 and mask 38 are movable independent of each other.

Figure 2:
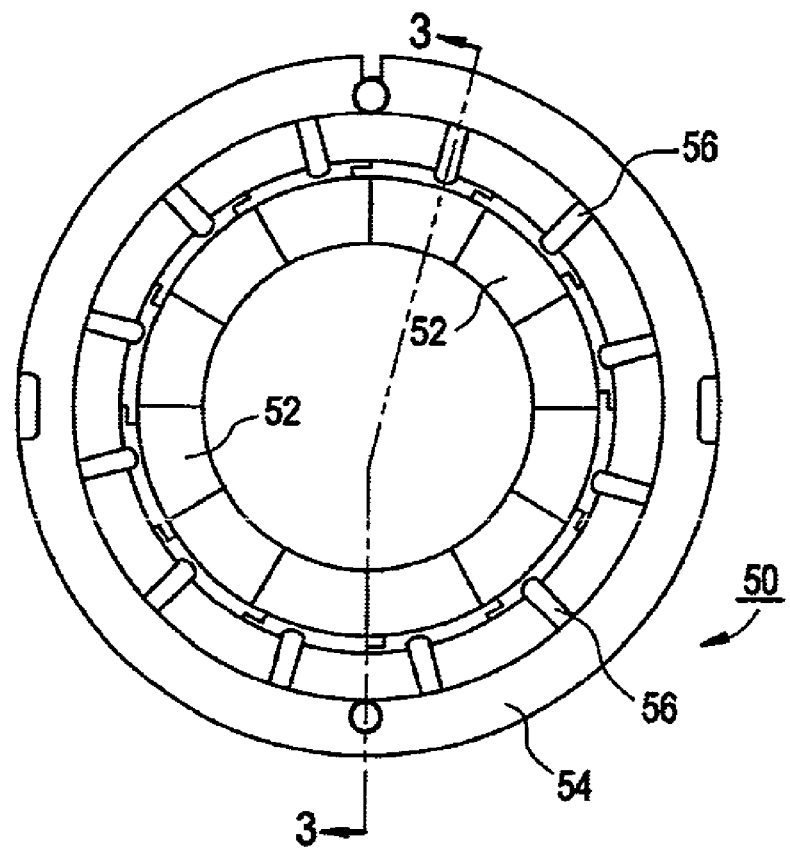
FIG. 2 is a top view of a peripheral feed hole controller.
Figure 3:
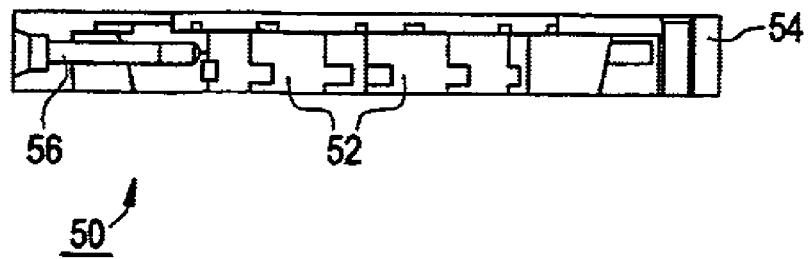
FIG. 3 is a cross-sectional view of the peripheral feed hole controller of FIG. 2 along line A—A; and, FIG. 4 is a sectional view of another aspect of the present invention showing a die, a peripheral feed hole and an extrudate bow corrector.

In another aspect of the present invention there is provided a peripheral feed flow device 50 as shown in FIGS. 2 (top view) and 3 (cross-sectional view). Peripheral feed flow device 50 is composed of segments 52, preferably six to twelve, movably mounted on a ring 54. Segments 52 can be adjusted radially to the flow direction of the material batch by rotation of bolts 56.

Figure 4:
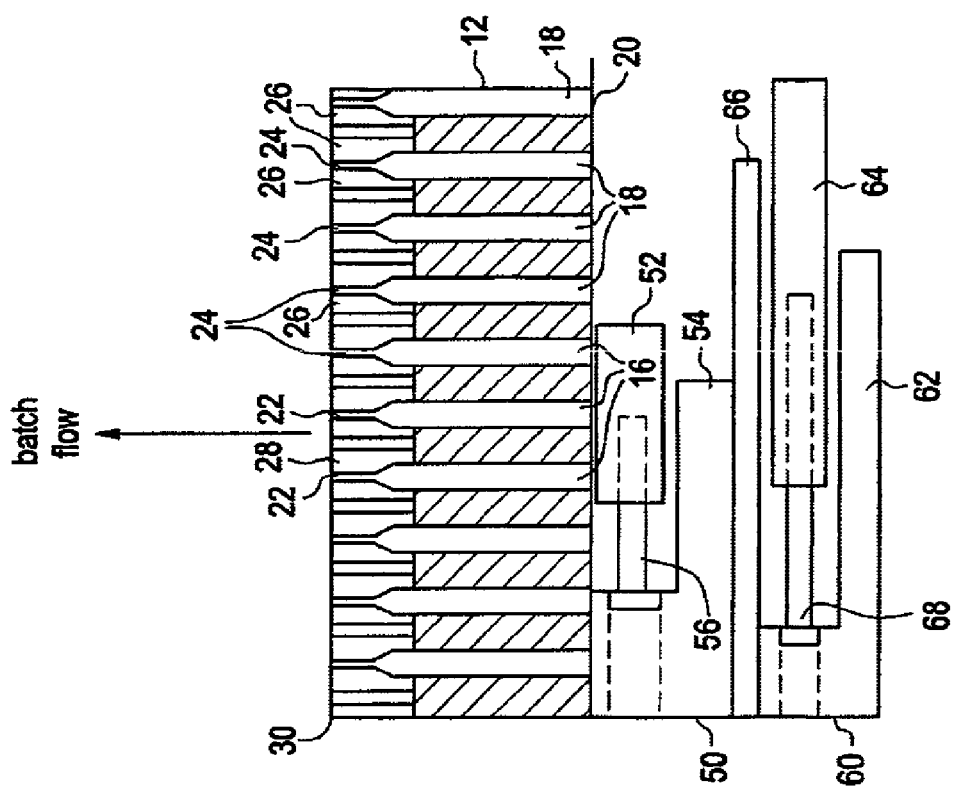

The peripheral feed flow device 50 is positioned upstream or adjacent inlet face 20 of the die 12, as shown in FIG. 4, and acts to regulate the batch flow into the peripheral feed holes 16. Segments 52 can be adjusted to control flow of the batch in one or more of peripheral feed holes 16, and at one or more locations around die 12. Consequently, batch flowing into the cavity 32 is also further controlled by peripheral feed flow device 50. The skin-forming assembly 14 (FIG. 1) and the peripheral feed flow device 50 act in combination to control the batch in the skin region of die 12.

In another aspect, the inventive honeycomb extrusion apparatus optionally includes an extrudate bow corrector 60 (FIG. 4). Such devices for correcting bow in a stream of extruded material are well known in the art, and suitable examples are provided in co-pending U.S. patent application having Ser. No. 09/967,110 now U.S. Pat. No. 6,663,378, issued Dec. 16, 2003, entitled "Apparatus and Method of Correcting Bow in a Honeycomb Extrudate" by Lubberts et al., and co-pending U.S. patent application having Ser. No. 10/370,840 and Publication 2004-0164464, published Aug. 26, 2004, entitled "Device and Method of Correcting Extrudate Bow" by Lubberts et al., both of which are herein incorporated by reference in their entirety.

The extrudate bow corrector 60 is positioned upstream of the die 12, adjacent the peripheral feel flow device 50, and includes a base 62 having an aperture (not shown) sufficiently large for the batch material to pass therethrough. A plurality of adjustable plates 64 movably mounted to the base are provided, each adjustable plate capable of being moved independently of the others at bolt 68, such that when the adjustable plates are adjusted to varying positions a correction is simultaneously effected in the direction and magnitude of a bow in a honeycomb extrudate. A cover 66 is also provided on the bow corrector 60, the cover being equal in size and shape to the base. The cover 66 acts to shield the adjustable plates, and is securely mounted to the base. It mirrors the base in size and shape, and includes an aperture (not shown) of equal or greater diameter to the base aperture.

As with the skin-forming assembly 14, both the peripheral feed flow device 50 and the bow corrector device 60 are adjustable externally to the extrusion apparatus. Again, a suitable wrench or pneumatic or hydraulic means may be used to control the movement of bolts (adjustment means) 56 and 68, and obtain the desired settings for peripheral feed flow device 50 and bow corrector 60, respectively.

In operation, the batch flowing towards the die first encounters the bow corrector device positioned to correct any degree of bow in the batch. Next, the exterior of the batch encounters the peripheral feed flow device which acts to control the flow of the batch into the peripheral feed holes of the die. At the exit of the peripheral flow device the batch enters the die, where it is extruded. The peripheral area of the batch encounters the skin-forming assembly which controls both the amount of batch coming out of the peripheral discharge slots, and the skin thickness. Control of the various components of the extrusion apparatus is made externally thereto. The resulting extruded structure, exiting the outlet end of the die, is a honeycomb having an integral outer skin is formed thereon.

Advantages of the extrusion apparatus in accordance with the present invention include: (1) customizable batch flow control; (2) more precise adjustment of differences in skin-body flow rates at multiple locations around the die; (3) external manipulation of the interior components controlling batch flow; (4) better control of the batch in skin forming area; (5) more precise adjustment of batch flow in the skin-forming area at multiple locations; (6) reduction in preferential flow of dies; (7) reduction in skin defects; (8) reduction in hardware costs; (9) reduction in hardware downtime; (10) increased product output.

Although the now preferred embodiments of the invention have been disclosed it will be apparent to those skilled in the art that various changes and modifications may be made thereto without departing from the spirit and scope of the invention as set forth in the appended claims.

What is claimed:

1. Apparatus for forming a honeycomb body which comprises:
    a die having an inlet face comprising peripheral feed holes and central feed holes, and an outlet face comprising interconnected discharge slots forming peripheral and central pins,
    wherein a cavity is formed in a plurality of peripheral pins at the outlet face for forming an outer skin on the honeycomb body;
    a skin-forming assembly positioned downstream from the die and adjacent the cavity at the outlet face,
    wherein the skin-forming assembly comprises a flow controller and a mask;
    wherein the flow controller and the mask are independent in movement;
    wherein the flow controller comprises a plurality of segments movable in an axial direction to batch flow;
    a peripheral feed flow device positioned upstream from the die, and adjacent the inlet face of the die,
    wherein the peripheral feed flow device comprises a plurality of segments movable in a radial direction to batch flow; and,
    adjustment means external to the extrusion apparatus for controlling the operation of the skin-forming assembly, and the peripheral feed flow device without interruption to the operation of the extrusion apparatus.

2. The apparatus of claim 1 wherein the skin-forming assembly controls batch flow and skin thickness in the skin-forming cavity of the die.

3. The apparatus of claim 2 wherein flow controller comprises six to twelve segments.

4. The apparatus of claim 1 wherein the peripheral feed flow device meters flow into the peripheral feed holes at the inlet face of the die.

5. The apparatus of claim 4 wherein the peripheral feed flow device comprises six to twelve segments.

6. The apparatus of claim 1 further comprising an extrudate bow corrector adjacent the peripheral feed flow device wherein the extrudate bow deflector includes a plurality of adjustable plates movable independently of each of other.

7. The apparatus of claim 1 further comprising an extrudate bow corrector adjacent the peripheral feed flow device.

8. The apparatus of claim 7 wherein the extrudate bow corrector includes adjustment means external to the extrusion apparatus for controlling the operation of the extrudate bow corrector without interruption to the operation of the extrusion apparatus.

* * * * *